United States Patent
Akai et al.

[11] Patent Number: 5,852,164
[45] Date of Patent: Dec. 22, 1998

[54] POLYESTER, PROCESS FOR PRODUCING THE SAME AND MOLDING PRODUCT THEREFROM

[75] Inventors: Hideko Akai; Katsuji Tanaka, both of Yokohama; Masahiko Fujimoto; Noboru Sato, both of Yokkaichi, all of Japan

[73] Assignee: Mitsubishi Chemical Corporation, Japan

[21] Appl. No.: 842,651

[22] Filed: Apr. 15, 1997

[30] Foreign Application Priority Data

| Apr. 16, 1996 | [JP] | Japan | 8-093858 |
| Jul. 9, 1996 | [JP] | Japan | 8-179117 |
| Aug. 5, 1996 | [JP] | Japan | 8-206059 |
| Aug. 5, 1996 | [JP] | Japan | 8-206060 |

[51] Int. Cl.[6] ............... C08G 63/78; C08K 3/02
[52] U.S. Cl. ............ 528/279; 528/275; 528/277; 528/280; 528/281; 528/283; 528/285; 528/286; 528/307; 528/308.6; 524/706; 524/710; 524/779; 524/783; 524/784; 524/785
[58] Field of Search ............ 528/275, 277, 528/279, 280, 281, 283, 285, 286, 307, 308.6; 524/706, 710, 779, 783, 784, 785

[56] References Cited

U.S. PATENT DOCUMENTS

| 4,010,145 | 3/1977 | Russin et al. | 528/280 |
| 4,104,263 | 8/1978 | Kenney | 528/279 |
| 4,122,107 | 10/1978 | Kenney | 528/279 |
| 4,128,533 | 12/1978 | Kohler et al. | 528/279 |
| 4,356,299 | 10/1982 | Cholod et al. | 528/279 |
| 4,424,140 | 1/1984 | Weinberg et al. | 502/155 |
| 4,440,924 | 4/1984 | Kuze et al. | 528/275 |
| 4,499,262 | 2/1985 | Fagerburg et al. | 528/279 |
| 4,692,506 | 9/1987 | Yatsu et al. | 528/296 |
| 5,021,485 | 6/1991 | Gugumus . | |
| 5,340,908 | 8/1994 | Idage et al. . | |
| 5,480,926 | 1/1996 | Fagerburg et al. | 524/86 |
| 5,608,031 | 3/1997 | Yau et al. | 528/281 |
| 5,650,481 | 7/1997 | Yau et al. | 528/280 |

FOREIGN PATENT DOCUMENTS 0 091 180  10/1983  European Pat. Off. .

OTHER PUBLICATIONS

Mater. Plast., Bucharest, 1980, 17(2), 85–88 Abstr. 1980: 585355.
Derwent Abstr. 97–041659/04.
Derwent Abstr. 94–006072/01.
Derwent Abstr. 77–335004/19.

*Primary Examiner*—Samuel A. Acquah
*Attorney, Agent, or Firm*—Nixon & Vanderhye

[57] ABSTRACT

A polyester comprises a dicarboxylic acid moiety comprising terephthalic acid or its ester forming derivative and a diol moiety comprising ethylene glycol and 1,4-cyclohexanedimethanol of 10 to 60 mol % based on the whole diol moiety, the intrinsic viscosity of the polyester being 0.68 to 0.95 dl/g, the "b" value of color tone of the produced pellets of polyester being −5 to 5, the number of the carboxylic acid terminals being not more than 30 eq/ton, and the sum of the numbers of the vinyl terminals, the vinylidene terminals and the methylcyclohexene terminals being not more than 25 eq/ton.

18 Claims, No Drawings

POLYESTER, PROCESS FOR PRODUCING THE SAME AND MOLDING PRODUCT THEREFROM

BACKGROUND OF THE INVENTION

The present invention relates to a polyester, a process for producing the polyester and a molding product therefrom. More particularly the present invention relates to a polyester comprising a copolymerized 1,4-cyclohexanedimethanol (hereinafter referred to as CHDM) in an amount of 10 to 60 mol % based on a diol moiety, having a high molecular weight, an excellent color tone, a high transparency and an excellent melt heat stability, a process for producing such a polyester, and a molding product made from such a polyester.

The polyester according to the present invention has a high molecular weight, an excellent color tone and a high transparency, and many molding products such as sheets, boards, extrusion blow molded bottles, extrusion laminates, etc. can be made from such a polyester.

The polyesters produced from copolymerization of a dicarboxylic acids component principally composed of terephthalic acid or its ester-forming derivative and a diol component principally composed of ethylene glycol and CHDM (an amount of CHDM in all diol components being 10 to 60 mol % based on the whole diol) (these polyesters being hereinafter referred to as PET comprising copolymerized CHDM) are widely used for various applications of sheets, boards, extrusion blow molded bottles, extrusion laminates, etc., because of their many excellent properties, inter alia impact strength, moldability and recyclability. In these applications, the polyesters are required to have a molecular weight above a certain level as well as melt heat stability for the improvement of moldability. Since the polyesters are often used for molding of the "conspicuous" articles which are placed under constant public observation, fine color tone and transparency are also the essential requirements for these polyesters. Another important property of these polyesters is moist heat resistance which is essential to remain free of change of quality or deterioration with passage of time under various weather and storage conditions.

On the other hand, PET comprising copolymerized CHDM is amorphous or low crystalline and their solid phase polymerization is very difficult, so that increase of their molecular weight must be achieved through melt polymerization alone. A method is known in which the PET comprising copolymerized CHDM are produced at a high temperature using a titanium compound as catalyst. This method, however, has the problems that the produced polymer is tinted in yellow, and that the degradation reaction is encouraged because of a high temperature, thereby making it unable to elevate the molecular weight. Also, the promotion of the degradation reaction tends to cause increase of the carboxylic acid terminals or olefin terminals such as vinyl terminals, vinylidene terminals and methylcyclohexene terminals of the produced polyester, thereby deteriorating its melt heat stability or moist heat resistance.

For the improvement of color tone in production of PET comprising copolymerized CHDM, Japanese Patent Application Laid-open (Kokai) No. 7-102047 proposes a method in which the esterification reaction is carried out by using a cobalt compound, and after the completion of esterification, a titanium compound and an antimony compound are added thereto, to conduct a polycondensation reaction. This method, however, is still incapable of providing a significant improvement of color tone of the polymer.

Japanese Patent Application Laid-open (Kokai) No. 7-324121 also proposes a method for improving the color tone and increasing the molecular weight in the production of PET comprising copolymerized CHDM, according to which ester exchange reaction is carried out by using a cobalt compound and after the completion of ester exchange reaction, a phosphorus compound is added thereto, followed by the addition of a titanium compound to conduct a polycondensation reaction. However, the improvement of color tone by this method is still unsatisfactory, and the molecular weight of the produced polymer is also not increased to the desired level.

Further, WO 94/25502 proposes a method using a manganese compound, a zinc compound, a titanium compound, a phosphorus compound, a cobalt compound and a germanium compound for the improvement of color tone and the increase of molecular weight of the PET comprising copolymerized CHDM. This method, however, has the problems that the production process is complex because of the increased number of the compounds such as catalyst involved in the reaction, and that the use of a zinc compound is detrimental to color tone stability in long-time preservation of the produced polyester pellets.

In addition to the problem of color tone mentioned above, PET comprising copolymerized CHDM are also generally poor in melt heat stability. However, no effective method for the improvement thereof has been available. Also, no method is known for the improvement of moist heat resistance of the polyesters.

The technical problem of the present invention, therefore, is to provide a polyester significantly improved in the essential properties, that is, a polyester having an excellent color tone, a high transparency, an excellent melt heat stability and an excellent moist heat resistance as well as a high molecular weight, and a polyester molding product made from such a polyester.

As a result of the present inventors' earnest researches for obtaining PET comprising copolymerized CHDM having a excellent color tone, a high molecular weight, a high transparency, an excellent melt heat stability and an excellent moist heat resistance, it has been found that by carrying out an ester exchange reaction in the presence of a tetravalent titanium compound, and successively carrying out a polycondensation reaction by adding a phosphorus compound, a cobalt compound and a germanium compound and/or antimony compound, a polyester which is notably improved in color tone, transparency, melt heat stability and moist heat resistance and also has a high molecular weight, is produced. The present invention has been attained on the basis of the above finding.

SUMMARY OF THE INVENTION

In a first aspect of the present invention, there is provided a polyester comprising a dicarboxylic acid moiety comprising terephthalic acid or its ester forming derivative and a diol moiety comprising ethylene glycol and 1,4-cyclohexanedimethanol of 10–60 mol % based on the whole diol moiety, the intrinsic viscosity of the polyester being 0.68 to 0.95 dl/g, the "b" value of color tone of the produced pellets of polyester being −5 to 5, the number of the carboxylic acid terminals being not more than 30 eq/ton, and the sum of the numbers of the vinyl terminals represented by the following formula (1), the vinylidene terminals represented by the following formula (2) and the methylcyclohexene terminals represented by the following formula (3) being not more than 25 eq/ton.

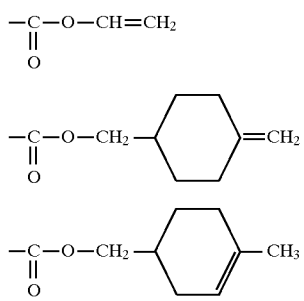

In a second aspect of the present invention, there is provided a molding product obtained by forming the polyester defined in the first aspect.

In a third aspect of the present invention, there is provided a process for producing a polyester, which comprises carrying out an ester exchange reaction among dimethyl terephthalate, ethylene glycol and 1,4-cyclohexanedimethanol of an amount of 10 to 60 mol % based on the whole diol moiety in the presence of a tetravalent titanium compound, and after completing the ester exchange reaction, adding a phosphorus compound, a cobalt compound, and a germanium compound and/or an antimony compound to carry out a polycondensation reaction with the final reaction temperature set at 240° to 280° C.

In a fourth aspect of the present invention, there is provided a process for producing a polyester, which comprises carrying out an ester exchange reaction among dimethyl terephthalate, ethylene glycol and 1,4-cyclohexanedimethanol of an amount of 10 to 60 mol % based on the whole diol moiety in the presence of a tetravalent titanium compound, and after completing the ester exchange reaction, adding a phosphorus compound, a cobalt compound, and a germanium compound and/or an antimony compound to carry out a polycondensation reaction with the final reaction temperature set at 240° to 280° C., the polycondensation reaction being controlled so that the polymerization reaction rate constant Kp and the degradation reaction rate constant Kd calculated from the following formula (4) fall in the ranges of the formula (5) and the formula (6), respectively:

$$n = 1/(1 + Kp \cdot t) + (2/3) \cdot Kd \cdot t \quad (4)$$

$$10 \ (\text{mol}^{-1} h^{-1}) \leq Kp \leq 30 \ (\text{mol}^{-1} h^{-1}) \quad (5)$$

$$0.0010 \ (\text{mol} \cdot h^{-1}) \leq Kd \leq 0.0030 \ (\text{mol} \cdot h^{-1}) \quad (6)$$

wherein n: number of moles of polymer in the polycondensation reaction product; t: time (hr) of the polycondensation reaction.

DETAILED DESCRIPTION OF THE INVENTION

The present invention is described in further detail below.

The polyester of the present invention is produced by using as starting materials a dicarboxylic acid moiety selected from terephthalic acid and its ester forming derivatives, ethylene glycol (hereinafter referred to as EG) and CHDM. The terephthalic acid ester forming derivatives usable in the present invention include lower alkyl esters such as dimethyl terephthalate, phenyl esters and acid anhydrides.

The intrinsic viscosity [η] of the polyester of the present invention, as measured in a phenol/ 1,1,2,2-tetrachloroethane mixed solvent (=1/1 by weight) at 30° C., is usually 0.68 to 0.95 dl/g, preferably 0.70 to 0.85 dl/g in view of the properties of the products such as sheets, boards, extrusion molded bottles, extrusion laminates, etc., and workability.

The color tone of the polyester of the present invention is shown as the "b" value in the expressions of "L", "a" and "b" values determined according to the method of JIS Z-8722 using a color analyzer TC-1800 MKII (manufactured by Tokyo Denshoku CO., LTD.). The "b" value of the polyester of the present invention is usually in the range from −5 to 5, preferably −4 to 3, more preferably −3 to 2. The more the "b" value designates the stronger yellowishness of the polyester color tone, and the smaller the "b" value (the larger the negative "b" value) represents the stronger bluishness. A titanium catalyst with high activity may be used for the preparation of the polyester of the present invention, but it is to be noted that too much addition of a titanium catalyst is detrimental to color tone of the produced polyester. The product "A" of the absolute values of the remaining amount of titanium (unit: ppm based on polyester) and the "b" value of pellet color tone is preferably 0 to 150, more preferably 0 to 100.

The number of the carboxylic acid terminals of the polyester of the present invention is not more than 30 eq/ton, preferably not more than 25 eq/ton, more preferably not more than 20 eq/ton, even more preferably not more than 15 eq/ton. The smaller the number of the carboxylic acid terminals, the more the improvement of the melt heat stability and moist heat resistance of the produced polyester.

The sum of the numbers of the vinyl terminals represented by the formula (1), the vinylidene terminals represented by the formula (2) and the methylcyclohexene terminals represented by the formula (3) (these terminals being hereinafter referred to comprehensively as olefin terminals) in the polyester of the present invention is not more than 25 eq/ton, preferably not more than 20 eq/ton, more preferably not more than 15 eq/ton. A smaller number of the olefin terminals is preferred for improving melt heat stability of the polyester.

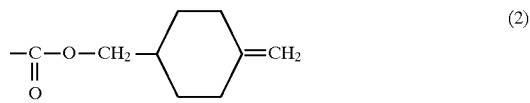

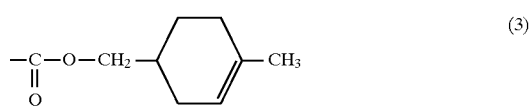

The metal residues in the polyester of the present invention can be determined by a conventional metal analysis. In view of the polymerization activity in the production process and color tone of the polyester, it is preferred that the total amount of the germanium and antimony compounds in the polyester, measured as metal residues in unit of ppm, is in the range of 5 to 500 ppm, more preferably 10 to 250 ppm. Also, in view of the polymerization activity in the production process, color tone of the polyester and color tone stability in long-time storage, the total amount of the zinc, manganese, tin and calcium compounds in the polyester, measured as metal residues (unit:ppm), is preferably not more than 100 ppm, more preferably not more than 20 ppm.

Transparency of the polyester of the present invention was determined by adding 2.7 g of the polymer in 20 ml of a 60/40 (by weight) mixed solution of phenol and 1,1,2,2-tetrachloroethane, dissolving the polymer in the solution by heating at about 130° C. for one hour, then after cooling, collecting the solution in a 10 mm thick quartz glass-made cell and measuring the haze of the solution by an integrating sphere color haze meter (Type SR, manufactured by Japan Fine Optical Co., Ltd.). The haze (%) of the solution of the polyester (measured at a wavelength of 550 nm) is preferably not more than 2.5, more preferably not more than 1.0.

The melt heat stability of the polyester of the present invention was determined by heat-treating 5 g of the pellets, which had been dried to a water content of not more than 100 ppm, at a temperature of 290° C. in an inert gas atmosphere for 3.5 hours, preparing a 14 g/dl chloroform solution thereof, and measuring the solution haze by a fully-automatic direct-reading haze computer (Type HGM-2DP, manufactured by Suga Testing Machinary Co., Ltd.). The thus determined solution haze represents as a heat stability, and its value is preferably not more than 15%, more preferably not more than 10%, even more preferably not more than 5%.

The polyester of the present invention is of high molecular weight and has an excellent color tone, a high transparency, an excellent melt heat stability and an excellent moist heat resistance, so that such polyester is particularly useful application to molding of such articles as sheets, extrusion blow molded bottles, extrusion laminates and the like. Especially, the sheets molded from this polyester are suited for packages, transparent draw-formed containers, sealants, blister packs and the like. Also, because of good color tone, the polyester can provide heavy-gage sheet moldings having good color tone. The heavy-gage sheets are much in demand recently and suited for many specific uses such as signboards, building materials, windows, green houses, etc.

In the case of a 2 mm thick sheet molded from the polyester of the present invention, the product "B" of the "b" value of the sheet color tone determined by the above-mentioned method and the absolute value of the residual amount of Ti (unit:ppm) in the sheet is preferably 0 to 200, more preferably 0 to 130.

The process of the present invention is described in further detail below.

The polyester of the present invention is produced by using as starting materials, dimethyl terephthalate (hereinafter referred to as DMT), ethylene glycol and CHDM.

The ratio of CHDM to the whole diol is preferably 10 to 60 mol %, more preferably 20 to 40 mol %, for obtaining a polyester having a high molecular weight, an excellent color tone, a high transparency, an excellent melt heat stability and an excellent moist heat resistance, and applicable to various types of articles, especially sheets, boards, extrusion blow molded bottles, extrusion laminates, etc. The trans form to the cis form molar ratio of CHDM is optional, but it is preferably 40:60 to 80:20. Small quantities of the dicarboxylic acids and diols may be used as other monomeric components.

Examples of the other dicarboxylic acids include aromatic dicarboxylic acids such as naphthalenedicarboxylic acid, phthalic acid, isophthalic acid, biphenyldicarboxylic acid, diphenylethanedicarboxylic acid, diphenyl ether dicarboxylic acid, diphenyl sulfone dicarboxylic acid, diphenyl ketone dicarboxylic acid, etc., and aliphatic dicarboxylic acids such as oxalic acid, malonic acid, succinic acid, adipic acid, sebacic acid, dodecanedicarboxylic acid, etc. When these acids are incorporated in the polymerization material, or added in the early phase of the ester exchange reaction, the acids are applied in the form an ester such as dimethyl ester or diethyl ester. The amount of these acids added is not be more than 15 mol % based on the whole dicarboxylic acid moiety in the produced polyester.

Examples of the other diols include aliphatic diols such as trimethylene glycol, tetramethylene glycol, neopentyl glycol, hexamethylene glycol, etc., and aromatic diols such as hydroquinone, resorcinol, methylhydroquinone, biphenol, bisphenol A, bisphenol S, etc. These diols may be incorporated in the polymerization material, or added in the early phase of the ester exchange reaction. The diols may be added after completion of the ester exchange reaction. The amount of these diols added is not more than 15 mol % based on the whole diol moiety in the produced polyester.

In the present invention, the dicarboxylic acid component may be replaced with an oxycarboxylic acid component derived from aromatic oxy-acids such as hydroxybenzoic acid and aliphatic oxy-acids such as (ω-hydroxycaproic acid in an amount of not more than 20 mol % based on the total amount of the dicarboxylic acids and oxycarboxylic acids. The acidic moiety may also be replaced with a tri- or more-order-functional polycarboxylic acid or polyhydroxylic substance, such as trimellitic acid or penthaerythritol, in an amount of within limits where the produced polyester remains substantially linear, for example, an amount of not more than 1 mol %, preferably not more than 0.5 mol % based on the whole acid moiety.

The polyester of the present invention can be produced by melt copolymerizing a dicarboxylic acid and a diol such as mentioned above.

A conventional batch-type or continuous melt polymerization apparatus generally used for the production of PET can be used. By using such a polymerizer, the starting materials, viz. DMT as ester-forming derivatives of terephthalic acid, EG and CHDM are directly subjected to an ester exchange reaction in the presence of tetravalent titanium compound, followed by gradual rise of temperature and decompression to conduct a polycondensation reaction. Such a polycondensation reaction may be conducted in a single stage, or in two or more stages. When the reaction is conducted in a single stage, gradual decompression and rise of temperature are conducted so that the final temperature fall within the range of 240° to 280° C., preferably 250° to 280° C., more preferably 250° to 270° C., while the final pressure is within the range of 5 to 0.1 mmHg, preferably 1 to 0.1 mmHg. The produced polyester is drawn out in the form of a strand from an outlet at the bottom of the reactor, then cooled with water and cut into chips.

In the above ester exchange reaction and polycondensation reaction, it is expedient to use an ester exchange catalyst, a polycondensation catalyst and a stabilizer.

As ester exchange catalyst, there can be used at least one of the known compounds such as calcium compounds, titanium compounds, manganese compounds, zinc compounds, tin compounds, sodium compounds and potassium compounds, and tetravalent titanium compounds are preferred for the reason of polymerizability.

Examples of the tetravalent titanium compounds usable in the present invention include titanium tetraalkoxides such as titanium tetramethoxide, titanium tetrabutoxide, titanium tetraisopropoxide, etc., and alkali metal salts of titanium halides such as titanium potassium hexafluoride, etc. Of these compounds, titanium tetrabutoxide and titanium potassium hexafluoride are preferred. When the number of moles of Ti atoms to $10^6$ moles of the acid moiety is expressed as Ti amount, the Ti amount is preferably in the range of 90 to 270 moles, more preferably 135 to 225 moles. A Ti amount in the range of 90 to 270 moles offers a good balance of polymerization reaction rate and degradation reaction rate. These titanium compounds may be used either singly or as a mixture of two or more.

An ester exchange reaction is carried out in the presence of such titanium compound(s). Titanium compound is added before the ester exchange reaction is substantially completed. "Substantial completion" of ester exchange reaction can be confirmed from release of the theoretical yield of methanol produced by the ester exchange reaction of DMT in the polymerization material with the diol. Preferably titanium compound is added in the polymerization material and/or in the early phase of the ester exchange reaction. As for the way of addition, the titanium compound may be added as a solution thereof in a solvent in which the titanium compound is soluble, for example, EG or butanol, or it may be added directly in the form as it is. In case of adding the solution, the concentration of the titanium compound in the solution is adjusted to be 0.1 to 5 wt %/vol.

A manganese compound may be added along with the titanium compound in the polymerization material and/or in the early phase of the ester exchange reaction. The amount of the manganese compound is not more than 240 moles, preferably not more than 100 moles in terms of the number of moles of Mg atoms to $10^6$ moles of the acid moiety. As for the way of addition, the manganese compound is added in the form of a solution in a solvent in which the manganese compound is soluble, such as EG. The concentration of the manganese compound in the solution is adjusted to be 0.1 to 5 wt %/vol.

Examples of the phosphorus compounds usable as a stabilizer in the present invention include phosphoric acid such as orthophosphoric acid and phosphoric esters such as trimethyl phosphate, triethyl phosphate, ethyl phosphate, diethyl phosphate and the like. Among them, ethyl phosphate and diethyl phosphate are preferred. When the number of moles of P atoms to $10^6$ moles of the acid moiety is expressed as P amount, the P amount is preferably 175 to 840 moles, more preferably 350 to 700 moles. These phosphorus compounds may be used either singly or as a mixture of two or more. Phosphorus compound is added after the ester exchange reaction has been substantially completed. When phosphorus compound is added during the ester exchange reaction, the reaction may become unable to proceed. As for the way of addition, the phosphorus compound is added in the form of a solution in a solvent in which the phosphorus compound is soluble, such as EG. The concentration of phosphorus compound in the solution is adjusted to be 0.1 to 10 wt %/vol.

Examples of the cobalt compounds usable in the present invention include organic cobalt salts such as cobalt acetate and cobalt propionate. Among them, cobalt acetate is preferred. These cobalt compounds may be hydrates such as tetrahydrates. The number of moles of Co atoms to $10^6$ moles of acid moiety, referred to as Co amount, is preferably 185 to 550 moles, more preferably 185 to 370 moles. These cobalt compounds may be used either singly or as a mixture of two or more. The molar ratio of the cobalt atoms to the phosphorus atoms is preferably 0.65 to 1.0, more preferably 0.7 to 0.9, since this range of the molar ratio offers a good balance of polymerizability, color tone and melt heat stability of the polyester.

Cobalt compound is added after the ester exchange reaction has been substantially completed. It is undesirable to add the cobalt compound during the ester exchange reaction since the color tone of the polyester may be deteriorated. In view of color tone, cobalt compound is preferably added after the addition of phosphorus compound. As for the way of addition, cobalt compound is added in the form of a solution in a solvent in which the cobalt compound is soluble, such as EG. The concentration of cobalt compound in the solution is 0.1 to 10 wt %/vol.

A preferred example of the germanium compounds usable in the present invention is germanium dioxide. The number of moles of Ge atoms to $10^6$ moles of acid moiety, referred to as Ge amount, is preferably 10 to 450 moles, more preferably 240 to 330 moles. Germanium compound is added after the ester exchange reaction has substantially completed. It is inadvisable to add the germanium compound during the ester exchange reaction since diethylene glycol is formed as a by-product to deteriorate heat stability of the product. Germanium compound is added in the form of a solution in a solvent in which the germanium compound is soluble, such as EG and water. The germanium compound concentration in the solution is adjusted to be 0.1 to 2 wt %/vol.

An antimony compound may be used in place of or together with the germanium compound after the ester exchange reaction has been substantially completed. In case of using an antimony compound, the number of moles of each Sb atom to $10^6$ moles of the acid moiety is preferably 140 to 620, more preferably 240 to 450. The antimony compound is added in the form of a solution in a solvent in which the antimony compound is soluble, such as EG. The concentration of the antimony compound in the solution is usually 0.1 to 5 wt %/vol.

In view of the catalyst activity and color tone of the produced polyester, it is preferable that the total amount of the germanium and antimony compounds in the polyester is preferably in the range of 10 to 1100 moles, more preferably 450 to 800 moles, in terms of the number of moles of each atom to $10^6$ moles of the acid moiety.

The polyester of the present invention can be produced by using a conventional batch-type or continuous melt polymerizer which has generally been used for the production of PET. By using such a polymerizer, DMT, CHDM and EG are supplied so that the diol to acid molar ratio in the feed will become usually 1.5 to 2.2, and the DMT, CHDM and EG are reacted at 160° to 250° C. in the presence of a tetravalent titanium compound for ester exchange reaction, followed by the addition of a phosphorus compound, a cobalt compound, and a germanium compound and/or antimony compound to carry out a polycondensation reaction. The polycondensation reaction may be conducted in a single stage or in two or more stages. In case where the reaction is conducted in a single stage, the temperature is raised gradually with gradual decompression so that the final reaction temperature fall in the range of 240° to 280° C., preferably 250° to 270° C., while the final pressure is in the range of 10 to 0.1 mmHg, preferably 5 to 0.1 mmHg. The produced polyester is drawn out as a strand from an outlet at the bottom of the reactor, then cooled with water and cut into chips.

In the polyester of the present invention, as the case of ordinary polyesters, additives, for example, antioxidants such as hindered phenols, phosphites or thioethers, ultraviolet absorbers such as benzotriazoles, benzophenones, benzoates, complex-types or cyanoacrylates, light stabilizers such as hindered amines, pigments such as titanium oxide, carbon black or terazolblue, dyes, release agents, etc. may be added to the polyester of the present invention.

It is possible to produce a polyester having a high molecular weight, an excellent color tone, a high transparency and an excellent melt heat stability by controlling the polymerization reaction rate constant and the degradation reaction rate constant during the polycondensation reaction. This method is described in detail below.

It is preferable to control the polycondensation proceeding so that the polymerization rate constant Kp and the degradation rate constant Kd which are calculated from the following formula (4), satisfy the following formulae (5) and (6) simultaneously.

$$n = 1/(1 + Kp \cdot t) + (2/3) \cdot Kd \cdot t \qquad (4)$$

$$10(\text{mol}^{-1} h^{-1}) \leq Kp \leq 30(\text{mol}^{-1} h^{-1}) \qquad (5)$$

$$0.0010(\text{mol} \cdot h^{-1}) \leq Kd \leq 0.0030(\text{mol} \cdot h^{-1}) \qquad (6)$$

wherein n is a molar amount of polymer present in the polycondensation reactant and t is passage of time in the polycondensation (unit:hour).

Kp and Kd are vary with the polymerization condition. That is, these values vary with polymerization temperature, kind of catalyst used, degree of reduced pressure, stirring rate, feed amount of raw materials and feed order of raw materials. When the values of Kp and Kd are adjusted so as to carry out the polymerization in the best condition, polyester which has high molecular weight and is excellent in color tone, transparency and melt thermal stability can be produced in good productivility. Namely, Kp (unit: $\text{mol}^{-1} h^{-1}$) is preferably 10 to 30, more preferably 12 to 30, even more preferably 15 to 30. Also, Kd (unit: $\text{mol} \cdot h^{-1}$) is preferably 0.0010 to 0.0030, more preferably 0.0010 to 0.0025, even more preferably 0.0010 to 0.0020. Further, the ratio of Kp/Kd is preferably 6000 to 30000, more preferably 8000 to 30000 because the polymerization and depolymerization proceed in well-balanced. The Kp and Kd can be led by above-mentioned formula (4) and the theoretical ground of the formulae is described in Polymer, 14, 50 (1973) and Polymer, 36, 2 (1995).

When the ratio of the whole diol moiety to the whole dicarboxylic acid moiety is outside the above-defined range, Kp in the polycondensation reaction become small. On the other hand, when part of the reaction materials, particularly CHDM is added at a certain point of the process, for example, just before start of the polycondensation reaction, Kd is enlarged.

It is to be also noted that when the polycondensation reaction is carried out in such a manner that the final reaction temperature exceeds 280° C., Kd is enlarged, making it impossible to increase the molecular weight of the produced polyester. When the final reaction temperature is less than 240° C., Kp is lessened and here again the molecular weight of the polyester may not increased. The fact is also notable that the more the degree of evacuation (reduced pressure), the smaller becomes Kd. When the degree of evacuation is low, diffusion and removal of the eliminated substances out of the system are retarded to enlarge Kd. For the same reason, the more the rate of stirring, the smaller becomes Kd. In view of the above, it is recommended to use a constant-torque infinitely variable speed stirring system.

By carrying out the polycondensation reaction by controlling Kp and Kd in the above-defined ranges, it is possible to obtain a polyester having a high degree of polymerization, an excellent color tone, a high transparency and an excellent melt heat stability, and capable of producing various types of moldings such as sheets, extrusion blow molded bottles, extrusion laminates, etc., having a good color tone, a high transparency and an excellent melt heat stability with a high productivity.

The known methods can be used for molding the polyester of the present invention into the desired molding product such as sheets, boards, extrusion blow bottles, extrusion laminates, etc. The melt molding includes an extrusion molding such as a sheet extrusion molding, an extrusion blow molding, etc., an injection molding, a press molding, etc. The polyester of the present invention is suited for producing a sheet having a thickness of 0.1 to 25 mm.

In case of forming the sheet by the extrusion molding, usually the material polyester is supplied to a hopper of a single- or twin-screw extruder connected to a T-die via a gear pump, and is melted in the extruder cylinder, extruded into the form of a sheet from the T-die and cooled by the casting rolls or on the flat plate.

The polyester of the present invention has an excellent melt heat stability, but for further improving this property, it is advisable to add an antioxidizing agent such as hindered phenols, phosphites and thioethers in the molding operation. Especially, hindered phenols such as pentaerythrityl-tetrakis [3-(3,5-di-t-butyl-4-hydroxyphenyl) propionate] and phosphites such as tris(2,4-di-t-butylphenyl)phosphite are preferred.

In this case, the molding temperature, specifically the temperature of the extruder cylinder parts, gear pump and T-die is usually set at 200° to 300° C., preferably 230° to 280° C. The surface temperature of the casting rolls is controlled at usually 15° to 70° C., preferably 20° to 60° C.

The extruder used for extrusion molding may have a vent port at the cylinder section. The material polyester usually contains several hundred to several thousand ppm of water. Therefore, in case of using an extruder having no vent port, the material polyester needs to be supplied to the hopper after its water content has been reduced to usually not more than 100 ppm, preferably not more than 50 ppm by conducting a drying treatment. In case an extruder having a vent port is used, since it is possible to dry the polyester in the evacuated cylinder, the polyester material can be supplied without drying and further the volatile impurities such as acetaldehyde contained in the material polyester can be reduced in the cylinder. The vent port is usually connected to a 0 to 7,000 Pa, preferably 0 to 3,000 Pa, more preferably 0 to 700 Pa decompression system.

The extruder T-die may be of the type in which the melt is discharged from a lip in the horizontal direction or vertical direction. The casting rolls are preferably adapted with a means for tightly attaching the extrudate, such as an electrostatic pinning device or touch rolls. Multi-stage cooling rolls are usually used for producing the thick sheets.

It is possible to produce a multi-layer sheet from the polyester of the present invention by a conventional method. It is also possible to form a multi-layer sheet with other types of polyester, such as polyethylene terephthalate, or other polymers such as acrylic resin.

A sheet with an excellent color tone, a high transparency and an excellent moist heat resistance can be produced from the polyester of the present invention by a known method such as mentioned above. Since the polyester of the present invention has particularly good color tone, it is especially suited for producing heavy-gage sheets. When the sheet thickness is not less than 2 mm, usually the resin color tone greatly affects the color tone of the sheet, but in case of using the polyester of the present invention, there can be obtained a heavy-gage sheet with a good color tone.

When the polyester of the present invention is worked into a heavy-gage sheet, it is advisable to add a weathering agent since this sheet is usually used outdoors. Examples of the weathering agents usable in the present invention include ultraviolet absorbers such as benzotriazoles, benzophenones, benzoates, complex-types and cyanoacrylates, and light stabilizers such as hindered amines. Of these weathering agents, benzotriazoles, for example, 2-(5-methyl-2-hydroxyphenyl) benzotriazole, 2-(3-t-butyl-5-methyl-2-hydroxyphenyl)-5-chlorobenzotriazole, 2-(4,6-diphenyl-1,3,5-triazine-2-yl)-5-(hexyl)oxy-phenol, and particularly, 2-[2-hydroxy-3,5-bis ($\alpha$, $\alpha$-dimethylbenzyl)phenyl]-2H-benzotriazole, and more particularly 2,2'-methylenebis[6-(2H-benzotriazole-2-yl)-4-(1,1,3,3-tetramethylbutyl)phenol] are preferred. Combined use of a benzotriazoles ultraviolet absorber and a hindered amines light stabilizer can provide long-time weatherability. A preferred example of hindered amines light stabilizer to be used in such combination is a succinic acid/1-(2-hydroxyethyl)-4-hydroxy-2,2,6,6-tetramethylpiperidine polycondensate. These weathering agents may be dry blended with the polyester, or they may be incorporated in a masterbatch. Such a weathering agent is added in an amount of 0.01 to 5 parts by weight, preferably 0.05 to 3 parts by weight based on the polyester.

It is also possible to produce an extrusion laminate by laminating a polyester layer on a base film which has been formed under the same conditions as in the case of extrusion cast molding described above.

It is further possible to produce the extrusion blow molded bottles by using an extrusion blow molder. The molding temperature in this case is usually 200° to 300° C., preferably 230° to 280° C. The extrusion blow molded bottles obtained by using the polyester of the present invention in the manner described above possess an excellent color tone, a high transparency and an excellent moisture/heat resistance.

EXAMPLES

The present invention will be described in further detail with reference to the examples and comparative examples, but it should be understood that these examples are merely intended to be illustrative and not to be construed as limiting the scope of the invention. All the "parts" are by weight unless otherwise noted.

(1) Intrinsic viscosity [$\eta$], color tone, solution haze and melt heat stability of the polyester were determined by the methods described above.

(2) Olefin terminals

The vinyl terminals of the formula (1) and the methylcyclohexene terminals of the formula (3) were counted from the peaks at 5.10 ppm and 5.38 ppm on 1H-NMR using detracted chloroform as solvent, respectively. The vinylidene terminals were determined from the peak at 4.61 ppm on NMR spectrum measured using a solution prepared by dissolving the polymer in a mixed solution of hexafluoroisopropanol (d2) and deutrated chloroform (3/7 by volume) to a concentration of about 2 wt % and adding about 30 $\mu$l of pyridine (d5) and about 20 mg of a shift reagent Pr(FOD)3.

(3) Carboxylic acid terminals 100 mg of polyester was dissolved in 5 ml of benzyl alcohol under heating and diluted by adding 5 ml of chloroform, and the solution was titrated with a 0.1N sodium hydroxide/benzyl alcohol solution using phenol red as indicator to determine the carboxylic acid terminals.

(4) Ratio (mol %) of CHDM to diol moiety in the polyester

This ratio was determined by NMR analysis using a sample allowed to stand for 20 minutes after discharging the produced polyester. The amount of the metal compound added is shown by the number of moles of metal atoms to $10^6$ moles of the acid moiety as described above.

(5) Calculation of Kp and Kd

Change of the molecular weight with passage of time was determined from the change of torque or rotational frequency during the polymerization, and the number of moles of the polymer was calculated from the following equation:

$$n = Mu/(M-MO)$$

wherein n represents number of moles of the polymer; Mu represents molecular weight per unit of polymer; M represents molecular weight of the polymer; MO represents molecular weight at start of polycondensation (t=0).

The molecular weight per unit of polymer was calculated, in the case of PET comprising 33 mol % of CHDM, from the molecular weight (132) of terephthalic acid moiety, the molecular weight (60) of EG moiety and the molecular weight (142) of CHDM moiety according to the followings:

$$132 \times 1 + 60 \times 0.67 + 142 \times 0.33 = 219$$

The passage of time (t) of polycondensation reaction and the number of moles (n) of the polymer were determined in the manner described above, and this relation was regressed to the above-shown formula to determine Kp and Kd.

Example 1

100 parts of DMT, 54.4 parts of EG and 25.9 parts of CHDM were supplied to a polymerizer. After replacement of the polymerizer atmosphere with $N_2$, titanium tetrabutoxide was added in an amount of 225 moles as Ti amount and the temperature of the obtained mixture was elevated to 240° C. in 2 hours in the nitrogen atmosphere. The mixture was maintained at 240° C. for one hour to carry out ester exchange reaction. Then an equimolar mixture of ethyl phosphate and diethyl phosphate was added in an amount of 440 moles (P amount), followed by further addition of 370 moles (Co amount) of cobalt acetate tetrahydrate and 300 moles (Ge amount) of germanium dioxide. Thereafter, the system was evacuated to 1 mmHg in one hour and 25 minutes, and the heat-up was started 20 minutes after start of evacuation with the final reaction temperature at 270° C. to carry out polymerization reaction. Polymerization was completed in 3 hours and 16 minutes after start of evacuation. The produced polyester was drawn out as a strand and pelletized. The pelletized polyester was molded at 280° C. to produce a board having a thickness of 2 mm.

The properties of the obtained polyester are shown in Table 1.

Example 2

To the polyester prepared in Example 1, 2,2'-methylenebis [6-(2H-benzotriazole-2-yl)-4-(1,1,3,3-tetramethylbutyl) phenol], tris(2,4-di-t-butylphenyl)phosphite and sccinic acid dimethyl ester.1-(2-hydroxyethyl)-4-hydroxy-2,2,6,6-tetramethylpiperidine polycondensate were blended (Blend I) so as to adjust the final weight percentage to 1.5, 0.48 and 0.12 weight %, respectively. To the polyethylene terephthalate (copolyester containing isophthalic acid of 2 mol % and having an intrinsic viscosity of 0.83), 2,2'-methylenebis[6-

(2H-benzotriazole-2-yl)-4-(1,1,3,3-tetramethylbutyl) phenol], tris(2,4-di-t-butylphenyl)phosphite and sccinic acid dimethyl ester.1-(2-hydroxyethl)-4-hydroxy-2,2,6,6-tetramethylpiperidine polycondensate were blended (Blend II) so as to adjust the final weight percentage to 0.25, 0.08 and 0.02 weight %, respectively. The Blend I for surface layers and the Blend II for inner layer were fed in a twin-screw coextruder and coextruded from T-die to obtain a molded sheet constituting two kind components and comprising three layers.

The above used ultraviolet absorbent, stabilizers and polyester were previously blended in a preparative masterbatch. The obtained molded sheet constituting two kind components and comprising three layers had the total thickness of 2 mm and surface layer thickness of 0.2 mm.

The characteristics of the polyester were evaluated by using of the obtained molded board and are shown in Table 1.

Example 3

The same polymerization procedure as in Example 1 was carried out except that diantimony trioxide was added in amount of 330 moles (Sb amount) instead of germanium compound. Polymerization was completed in 3 hours and 5 minutes after start of evacuation. The produced polyester was drawn out as a strand and pelletized. The pelletized polyester was molded at 280° C. to produce a board having a thickness of 2 mm.

The properties of this polyester are shown in Table 1.

Example 4

The same polymerization procedure as in Example 1 was carried out except that the final temperature of the vacuum polymerization reaction was set at 260° C. Polymerization was completed in 4 hours and 15 minutes after start of evacuation. The produced polyester was drawn-out as a strand and pelletized. The pelletized polyester was molded at 280° C. to produce a board having a thickness of 2 mm.

The results are shown in Table 1.

Example 5

100 parts of DMT, 54.4 parts of EG and 25.9 parts of CHDM were supplied to a polymerizer. After replacement of the atmosphere with $N_2$, titanium tetrabutoxide and manganese acetate tetrahydrate were added in an amount of 225 moles as Ti amount and 45 moles as Mn amount, respectively, and the temperature of the obtained mixture was elevated to 240° C. in 2 hours in the nitrogen atmosphere. The mixture was maintained at 240° C. for one hour to carry out ester exchange reaction. Then, an equimolar mixture of ethyl phosphate and diethyl phosphate was added in an amount of 440 moles as P amount, followed by further addition of 370 moles (as Co amount) of cobalt acetate tetrahydrate and 330 moles (as Sb amount) of diantimony trioxide. Thereafter the system was evacuated to 1 Torr in one hour and 25 minutes and the heat-up was started 20 minutes after start of evacuation with the final reaction temperature at 270° C. to conduct polymerization reaction. Polymerization was completed in 2 hours and 58 minutes after start of evacuation. The produced polyester was drawn out as a strand and pelletized. The properties of the obtained polyester are shown in Table 1.

Example 6

The same polymerization procedure as in Example 1 was followed except that the amounts of reactants were 135 moles as Ti amount, 240 moles as P amount, 200 moles as Co amount and 300 moles as Ge amount. Polymerization was completed in 4 hours after start of evacuation. The produced polyester was drawn out as a strand and pelletized. The properties of this polyester are shown in Table 1.

Example 7

100 parts of DMT, 54.4 parts of EG and 25.9 parts of CHDM were supplied to a polymerizer. After replacement of the atmosphere with $N_2$, titanium tetrabutoxide and manganese acetate tetrahydrate were added in an amount of 225 moles as Ti amount and 178 moles as Mn amount, respectively, and the temperature of the obtained mixture was elevated to 240° C. in 2 hours in the nitrogen atmosphere. The mixture was maintained at 240° C. for one hour to carry out ester exchange reaction. Then, an equimolar mixture of ethyl phosphate and diethyl phosphate was added in an amount of 420 moles as P amount, followed by further addition of 350 moles (as Co amount) of cobalt acetate tetrahydrate and 15 moles (as Ge amount) of germanium dioxide. Thereafter the system was evacuated to 1 mmHg in one hour and 25 minutes and the heat-up was started 20 minutes after start of evacuation with the final reaction temperature set at 270° C. to conduct polymerization reaction. Polymerization was completed in 4 hours after start of evacuation. The produced polyester was drawn out as a strand and pelletized. The properties of the obtained polyester are shown in Table 1.

Example 8

The same polymerization procedure as in Example 1 was carried out except that the amounts of reactants were 135 moles as Ti amount, 266 moles as P amount and 220 moles as Co amount. Polymerization was completed in 3 hours and 45 minutes after start of evacuation. The produced polyester was drawn out as a strand and pelletized. The properties of this polyester are shown in Table 1.

Example 9

The same polymerization procedure as in Example 1 was carried out that the amounts of reactants were 90 moles as Ti amount, 220 moles as P amount, 185 moles as Co amount and 450 moles as Ge amount. Polymerization was completed in 4 hours and 30 minutes after start of evacuation. The produced polyester was drawn out as a strand and pelletized. The properties of this polyester are shown in Table 1.

Example 10

The same polymerization procedure as in Example 1 was carried out except that the amounts of reactants were 90 moles as Ti amount, 260 moles as P amount, 258 moles as Co amount and 300 moles as Ge amount, and the polymerization reaction temperature was 250° C. Polymerization was completed in 5 hours and 45 minutes after start of evacuation. The produced polyester was drawn out as a strand and pelletized. The properties of this polyester are shown in Table 1.

Example 11

The same polymerization procedure as in Example 1 was carried out except that the final temperature of the vacuum polymerization reaction was set at 280° C. Polymerization was completed in 3 hours and 30 minutes after start of evacuation. The produced polyester was drawn out as a stand and pelletized. The results are shown in Table 1.

Example 12

The same polymerization procedure as in Example 1 was carried out except that the amount of germanium compound was 15 moles as Ge amount and that the polymerization reaction was carried out at 260° C. Polymerization was completed in 5 hours and 20 minutes after start of evacuation. The produced polyester was drawn out as a strand and pelletized. The properties of this polyester are shown in Table 1.

Example 13

The same polymerization procedure as in Example 1 was carried out except that 85 parts of DMT, 15 parts of dimethyl isophthalate, 59.1 parts of EG and 12.4 parts of CHDM were initially supplied to the polymerizer. Polymerization was completed in 4 hours after start of evacuation. The produced polyester was drawn out as a strand and pelletized. The results are shown in Table 3.

Comparative Example 1

The same polymerization procedure as in Example 1 was carried out except that the polymerization reaction temperature was set at 290° C. Polymerization was completed in 3 hours and 45 minutes after start of evacuation. In the polymerization operation, the stirring torque finally failed to rise up and the polymerization reaction was unable to proceed any longer. The produced polyester was drawn out as a strand and pelletized. The properties of this polyester are shown in Table 1.

Comparative Example 2

100 parts of DMT, 54.5 parts of EG and 25.9 parts of CHDM were supplied to the polymerizer. After replacing the atmosphere with $N_2$, titanium tetrabutoxide, manganese acetate tetrahydrate and zinc acetate dihydrate were added in amounts of 9 moles as Ti amount, 100 moles as Mn amount and 265 moles as Zn amount, respectively, and the temperature of the obtained mixture was elevated to 220° C. in 2 hours in the nitrogen atmosphere. The mixture was maintained at 220° C. for one hour to carry out ester exchange reaction. Then, cobalt acetate tetrahydrate was added in an amount of 103 moles as Co amount, followed by the addition of 98 moles (as P amount) of triethyl phosphate. Then the temperature of the mixture was elevated to 280° C. in 2 hours and 30 minutes, maintained at 280° C. for 15 minutes and then evacuated to 1 Torr in 55 minutes to carry out polymerization reaction. Polymerization was completed in 3 hours after start of evacuation. In the polymerization operation, it finally became impossible to raise the stirring torque and the polymerization reaction could not proceed any longer. The produced polyester was drawn out as a strand and pelletized. The properties of this polyester are shown in Table 1.

Comparative Example 3

The same polymerization procedure as in Example 1 was carried out except that the amounts of the reactants were 300 moles as Ti amount, 440 moles as P amount, 370 moles as Co amount and 0 mole as Ge amount. Polymerization was completed in 3 hours and 15 minutes after start of evacuation. The produced polyester was drawn out as a strand and pelletized. The properties of this polyester are shown in Table 1.

Comparative Example 4

100 parts of DMT, 54.4 parts of EG and 25.9 parts of CHDM were supplied to the polymerizer. After replacing its atmosphere with $N_2$, titanium tetrabutoxide and manganese acetate tetrahydrate were added in amounts of 250 moles as Ti amount and 178 moles as Mn amount, respectively, and the temperature of the obtained mixture was elevated to 240° C. in 2 hours in the nitrogen atmosphere. The mixture was maintained at 240° C. for one hour to carry out ester exchange reaction. Then cobalt acetate tetrahydrate was added in an amount of 330 moles as Co amount, followed by the addition of 525 moles (as P amount) of triethyl phosphate. Thereafter, the system was evacuated to 1 Torr in one hour and 25 minutes and the heat-up was initiated 20 minutes after start of evacuation with the final temperature reaching 280° C. to conduct polymerization reaction. Polymerization was completed in 3 hours and 25 minutes after start of evacuation. The produced polyester was drawn out as a strand and pelletized. The properties of this polyester are shown in Table 1.

Comparative Example 5

100 parts of terephthalic acid, 25.0 parts of EG and 28.6 parts of CHDM were supplied to the polymerizer, and after replacement of the atmosphere with $N_2$, cobalt acetate tetrahydrate and trimethyl phosphate were added in amounts of 330 moles as Co amount and 420 moles as P amount, respectively. The temperature of the obtained mixture was elevated to 240° C. in 2 hours in the nitrogen atmosphere. The mixture was maintained at 240° C. or one hour to carry out ester exchange reaction. Then titanyl potassium oxalate was added in an amount of 180 moles as Ti amount, followed by the addition of 445 moles (as Sb amount) of antimony trioxide. Thereafter, the system was evacuated and the heat-up was started 20 minutes after start of evacuation with the final temperature of 285° C. to carry out polymerization reaction. Polymerization was completed in 2 hours and 10 minutes after start of evacuation. The produced polyester was drawn out as a strand and pelletized. The properties of the obtained polyester are shown in Table 2.

Comparative Example 6

100 parts of DMT, 54.4 parts of EG and 25.9 parts of CHDM were supplied to the polymerizer. After replacement of the atmosphere with $N_2$, manganese acetate tetrahydrate and cobalt acetate tetrahydrate were added in amounts of 158 moles as Mn amount and 258 moles as Co amount, respectively. The temperature of the obtained mixture was elevated to 240° C. in 2 hours in the nitrogen atmosphere. The mixture was maintained at 240° C. for one hour to carry out ester exchange reaction, and then an equimolar mixture of ethyl phosphate and diethyl phosphate was added in an amount of 554 moles as P amount, followed by the addition of 225 moles (as Ti amount) of titanium tetrabutoxide. Then the system was evacuated and the heat-up was started 20 minutes after start of evacuation with the final reaction temperature 270° C. to carry out polymerization reaction. Polymerization was completed in 5 hours after start of evacuation. In the polymerization operation, it finally became impossible to raise the stirring torque and the polymerization reaction could not proceed any longer. The produced polyester was drawn out as a strand and pelletized. The results are shown in Table 1.

Comparative Example 7

The same polymerization procedure as in Example 1 was carried out except that the amounts of the reactants were 300 moles as Ti amount, 440 moles as P amount, 370 moles as Co amount and 0 mole as Ge amount and the polymerization reaction was carried out at the final reaction temperature of 270° C. under 3 mmHg. Polymerization was completed in 5 hours and 15 minutes after start of evacuation. In the polymerization operation, it finally became impossible to raise the stirring torque and the polymerization reaction could not proceed any longer. The produced polyester was drawn out as a strand and pelletized. The results are shown in Table 1.

Comparative Example 8

The same polymerization procedure as in Example 1 was carried out except that the amounts of the reactants were 300 moles as Ti amount, 440 moles as P amount, 370 moles as Co amount and 0 mole as Ge amount, and the stirring was conducted at 10 rpm at the start of evacuation. Polymerization was completed in 5 hours after start of evacuation. In the polymerization operation, it finally became impossible to raise the stirring torque and the polymerization reaction could not proceed any longer. The produced polyester was drawn out as a strand and pelletized. The results are shown in Table 1.

TABLE 1

|  | Percentage of CHDM component (mol %) | [η] (DL/G) | b value | Transparency (solution haze %) | Carboxyl end group (EQ/TON) | Olefinic end group (EQ/TON) |
|---|---|---|---|---|---|---|
| Ex. 1 | 34 | 0.830 | −2.1 | 0 | 14 | 8 |
| Ex. 2 |  |  |  |  |  |  |
| Ex. 3 | 33 | 0.821 | 1.2 | 0.9 | 15 | 9 |
| Ex. 4 | 34 | 0.830 | −2.1 | 0 | 19 | 8 |
| Ex. 5 | 34 | 0.823 | 1.1 | 0.8 | 18 | 8 |
| Ex. 6 | 33 | 0.744 | −2.3 | 0 | 9 | 0 |
| Ex. 7 | 32 | 0.767 | 2.5 | 0.9 | 1 | 6 |
| Ex. 8 | 33 | 0.808 | −0.3 | 0.4 | 23 | 0 |
| Ex. 9 | 33 | 0.800 | −0.1 | 0.2 | 25 | 0 |
| Ex. 10 | 34 | 0.819 | −0.1 | 0 | 27 | 0 |
| Ex. 11 | 33 | 0.785 | −0.6 | 0.4 | 28 | 16 |
| Ex. 12 | 34 | 0.785 | −0.8 | 0.5 | 12 | 5 |
| Ex. 13 | 15 | 0.803 | −0.1 | 0.8 | 19 | 4 |
| Comp. Ex. 1 | 34 | 0.675 | 4.5 | 1.0 | 46 | 30 |
| Comp. Ex. 2 | 34 | 0.670 | 6.0 | 2.0 | 74 | 32 |
| Comp. Ex. 3 | 33 | 0.756 | 6.0 | 2.7 | 33 | 25 |
| Comp. Ex. 4 | 32 | 0.823 | 4.6 | 1.4 | 42 | 27 |
| Comp. Ex. 5 | 33 | 0.700 | 10.3 | 2.7 | 35 |  |
| Comp. Ex. 6 | 34 | 0.728 | 13.8 | 5.0 | 31 |  |
| Comp. Ex. 7 | 34 | 0.688 | 10.0 | 1.7 | 33 |  |
| Comp. Ex. 8 | 33 | 0.421 | −0.5 | 0.4 | 35 |  |

|  | Ge + Sb (PPM/polymer) | Zn + Mn + Sn + Ca (PPM/polymer) | Thermal stability (solution haze %) | A | B |
|---|---|---|---|---|---|
| Ex. 1 | 100 | 0 | 4.2 | 99 | 71 |
| Ex. 2 |  |  |  |  | 70 |
| Ex. 3 | 185 | 0 | 4.8 | 60 | 130 |
| Ex. 4 | 100 | 11 | 3.5 | 100 | 75 |
| Ex. 5 | 185 | 0 | 4.8 | 55 | 100 |
| Ex. 6 | 100 | 0 | 3.6 | 69 |  |
| Ex. 7 | 5 | 45 | 4.0 | 138 |  |
| Ex. 8 | 100 | 0 | 3.4 | 9 |  |
| Ex. 9 | 150 | 0 | 3.2 | 2 |  |
| Ex. 10 | 100 | 0 | 3.1 | 2 |  |
| Ex. 11 | 100 | 0 | 4.5 | 30 |  |

TABLE 1-continued

| Ex. 12 | 5 | 0 | 3.8 | 40 |
|---|---|---|---|---|
| Ex. 13 | 100 | 0 | 4.3 | 5 |
| Comp. Ex. 1 | 100 | 0 | 23.0 | 225 |
| Comp. Ex. 2 | 0 | 105 | 21.4 | 12 |
| Comp. Ex. 3 | 0 | 0 | 16.1 | 400 |
| Comp. Ex. 4 | 0 | 45 | 20.5 | 250 |
| Comp. Ex. 5 | 250 | 0 |  | 410 |
| Comp. Ex. 6 | 0 | 40 |  | 690 |
| Comp. Ex. 7 | 0 | 0 |  | 500 |
| Comp. Ex. 8 | 0 | 0 |  | 25 |

|  | Kp (mol$^{-1}$ · h$^{-1}$) | Kd (mol · h$^{-1}$) | Kp/Kd (mol$^{-2}$) |
|---|---|---|---|
| Ex. 1 | 21 | 0.0012 | 17500 |
| Ex. 2 |  |  |  |
| Ex. 3 | 23 | 0.0014 | 14700 |
| Ex. 4 | 18 | 0.0010 | 18000 |
| Ex. 5 | 23 | 0.0014 | 14700 |
| Ex. 6 | 18 | 0.0019 | 9500 |
| Ex. 7 | 19 | 0.0020 | 9500 |
| Ex. 8 | 20 | 0.0017 | 11800 |
| Ex. 9 | 18 | 0.0017 | 10600 |
| Ex. 10 | 13 | 0.0011 | 11800 |
| Ex. 11 | 26 | 0.0029 | 9000 |
| Ex. 12 | 16 | 0.0017 | 9400 |
| Ex. 13 | 20 | 0.0018 | 11100 |
| Comp. Ex. 1 | 31 | 0.0051 | 6100 |
| Comp. Ex. 2 | 24 | 0.0040 | 6000 |
| Comp. Ex. 3 | 25 | 0.0030 | 8300 |
| Comp. Ex. 4 | 27 | 0.0032 | 8400 |
| Comp. Ex. 5 | 32 | 0.0045 | 7100 |
| Comp. Ex. 6 | 21 | 0.0034 | 6200 |
| Comp. Ex. 7 | 19 | 0.0033 | 5800 |
| Comp. Ex. 8 | 7.5 | 0.0040 | 1900 |

What is claimed is:

1. A polyester comprising a dicarboxylic acid moiety comprising terephthalic acid or its ester forming derivative and a diol moiety comprising ethylene glycol and 1,4-cyclohexanedimethanol of 10 to 60 mol % based on the whole diol moiety;

the intrinsic viscosity of the polyester being 0.68 to 0.95 dl/g, the "b" value of color tone of the produced pellets of polyester being −5 to 5, the number of the carboxylic acid terminals being not more than 30 eq/ton, and the sum of the numbers of the vinyl terminals represented by the following formula (1), the vinylidene terminals represented by the following formula (2) and the methylcyclohexene terminals represented by the following formula (3) being not more than 25 eq/ton.

 (1)

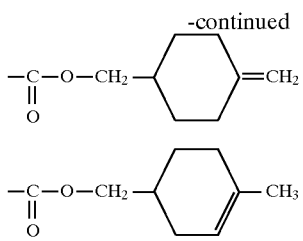

(2)

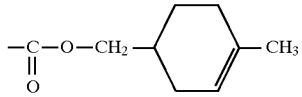

(3)

2. A polyester according to claim 1, wherein the sum of a germanium compound and an antimony compound contained in the polyester is 5 to 500 ppm as Ge and Sb amounts, and the sum of a zinc compound, a manganese compound, a tin compound and a calcium compound contained in the polyester is not more than 100 ppm as Zn, Mn, Sn and Ca amounts.

3. A polyester according to claim 1, wherein the haze of the solution of the polyester pellets which have been heat treated at 290° C. for 3.5 hours in an inert gas is not more than 15%.

4. A polyester according to claim 1, wherein the amount of 1,4-cyclohexanedimethanol is 20 to 40% based on the whole diol moiety.

5. A polyester according to claim 1, wherein the product of the absolute values of the amount of titanium metal, unit:ppm, in the polyester and the b value of color tone of the polyester pellets is 0 to 150.

6. A molding product obtained by forming the polyester defined in claim 1.

7. A molding product according to claim 6, wherein the molding product is sheet having a thickness of 0.1 to 25 mm, obtained by an extrusion molding of the polyester defined in claim 1.

8. A molding product according to claim 7, wherein the molding product is obtained by an extrusion molding of the polyester defined in claim 1 and a weathering agent.

9. A molding product according to claim 6, wherein the product of the absolute values of the amount of titanium metal, unit:ppm, in the molding product and the b value of color tone of the molding product is 0 to 200.

10. A process for producing a polyester, which comprises carrying out an ester exchange reaction among dimethyl terephthalate, ethylene glycol and 1,4-cyclohexanedimethanol of an amount of 10 to 60 mol % based on the whole diol moiety in the presence of a tetravalent titanium compound, and after completing the ester exchange reaction, adding a phosphorus compound, a cobalt compound, and a germanium compound, an antimony compound or a mixture of the germanium compound and the antimony compound to carry out a polycondensation reaction with the final reaction temperature set at 240° to 280° C.

11. A process according to claim 10, wherein the polycondensation reaction is carried out with the final reaction temperature set at 250° to 270° C.

12. A process according to claim 10, wherein a tetravalent titanium compound, a phosphorus compound and a cobalt compound are added in such amounts that satisfy all at once the relations of the following formulae defining the number of moles of each atom to $10^6$ moles of acid moiety:

$$90 \leq Ti \leq 270$$

$$175 \leq P \leq 840$$

$$185 \leq Co \leq 550.$$

13. A process according to claim 10, wherein a germanium compound and an antimony compound are added in such amounts that satisfy all at once the relations of the following formulae defining the number of moles of each atom to $10^6$ moles of acid moiety:

$$10 \leq Ge \leq 450$$

$$140 \leq Sb \leq 620.$$

14. A process according to claim 10, wherein the tetravalent titanium compound is at least one selected from the group consisting of titanium tetraalkoxide and an alkali metal salt of titanium halide, the phosphorus compound is at least one selected from the group consisting of phosphoric acid and a phosphoric ester, the cobalt compound is at least one selected from the group consisting of an organic cobalt salt and a hydrate thereof, the germanium compound is germanium dioxide, and the antimony compound is diantimony trioxide.

15. A process according to claim 10, wherein the phosphorus compound and the cobalt compound are added so that the molar ratio of the cobalt atoms to the phosphorus atoms is 0.65 to 1.0.

16. A process according to claim 10, wherein after the completion of the ester exchange reaction, a phosphorus compound, a cobalt compound, and a germanium compound, an antimony compound or a mixture of the germanium compound and the antimony compound are added successively in that order.

17. A process according to claim 10, wherein the polycondensation reaction is controlled so that the polymerization reaction rate constant Kp and the degradation reaction rate constant Kd calculated from the following formula (4) fall in the ranges of the formula (5) and the formula (6), respectively:

$$n=1/(1+Kp \cdot t)+(2/3) \cdot Kd \cdot t \tag{4}$$

$$10 \ (mol^{-1}h^{-1}) \leq Kp \leq 30 \ (mol^{-1}h^{-1}) \tag{5}$$

$$0.0010 \ (mol \cdot h^{-1}) \leq Kd \leq 0.0030 \ (mol \cdot h^{-1}) \tag{6}$$

wherein n: number of moles of polymer in the polycondensation reaction product; t: time (hr) of the polycondensation reaction.

18. A process according to claim 17, wherein the ratio of the polymerization reaction rate constant Kp to the degradation reaction rate constant Kd falls in the range of the following formula:

$$6{,}000 \ mol^{-2} \leq Kp/Kd \leq 30{,}000 \ mol^{-2}.$$

* * * * *